United States Patent Office 3,128,764
Patented Apr. 14, 1964

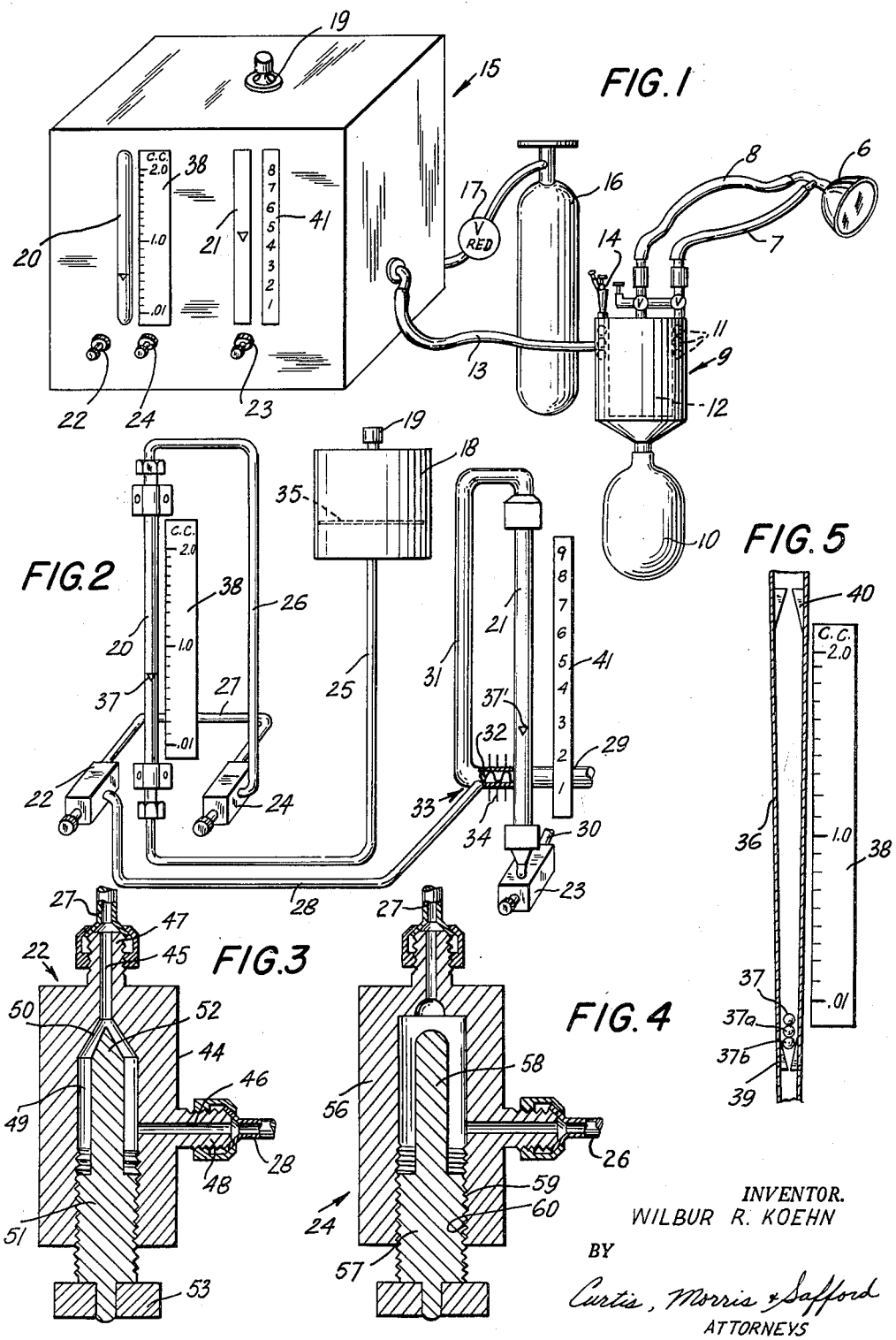

3,128,764
ANESTHESIZING APPARATUS
Wilbur R. Koehn, Sherwood Drive, Sands Point,
Long Island, N.Y.
Filed Oct. 6, 1960, Ser. No. 60,829
5 Claims. (Cl. 128—188)

The present invention relates to anesthetizing apparatus and more particularly to an improved apparatus for more accurately controlling the concentration of liquid anesthetics delivered to a patient.

In conventional anesthetizing apparatus, oxygen is bubbled through a liquid anesthetic to produce a saturated mixture and the saturated mixture is then diluted with additional oxygen before it is delivered to the patient. The volume of the diluted mixture is then measured in a gas flow meter to determine the amount of anesthetic that the patient consumes. Such a method of measurement and control is not accurate as the amount of anesthetic in a saturated mixture with oxygen varies considerably with differences in temperature and pressure as does also the concentration of the anesthetic in the diluted mixture being measured.

While the conventional anesthetizing apparatus is fairly satisfactory for the more commonly used liquid anesthetics, such as ether, it cannot be used safely with other anesthetics such as the recently developed 2-bromo-2-chloro-1,1,1-trifluoroethane and known by the trade names of Halothane and Fluothane. This latter anesthetic is a non-inflammable, non-explosive, volatile liquid and has many advantages over the more commonly used anesthetics except that its concentration must be accurately controlled and maintained below three and preferably below two percent by volume in an oxygen mixture.

One of the objects of the present invention is to provide an improved apparatus for administering anesthetics which accurately controls and measures the concentration of the anesthetic supplied to a patient.

Another object is to provide an apparatus of the type indicated which measures the flow rate of the anesthetic in liquid phase and then evaporates the liquid into oxygen at a measured flow rate to produce the desired concentration of anesthetic in the mixture.

Another object is to provide a liquid flow meter and reset device in an anesthetizing apparatus which is adapted to accurately control and measure the amount of liquid anesthetic supplied at extremely low rates of flow.

Still another object is to provide an apparatus of the type indicated which is of simple and compact construction, economical to manufacture, reliable in operation and one which increases the safety factor in applying anesthetics.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings

FIGURE 1 is a perspective view of a simplified form of anesthetizing apparatus incorporating the novel features of the present invention;

FIGURE 2 is a perspective view of the flow control system of the apparatus and showing the flow meter for measuring the flow rate of liquid anesthetic and the valve and meter reset devices for adjusting the flow rate at slow rates of flow;

FIGURE 3 is a sectional view of the needle valve for controlling the rate of flow of the liquid anesthetic;

FIGURE 4 is a sectional view of the device for resetting the meter to quickly indicate a change at slow flow rates; and FIGURE 5 is a sectional view of the flow meter.

Referring now to the drawing, FIGURE 1 illustrates an anesthetizing system incorporating the present invention. The system includes a conventional face mask 6 which is connected by separate tubes 7 and 8 to a recycling filter 9 having a breathing bag 10 depending therefrom. The patient inhales a gaseous mixture of anesthetic and oxygen through tube 7 from an annular space 11 at the outer periphery of the filter 9, and exhales through tube 8 into a porous body 12 of a carbon dioxide absorbent, such as soda lime, at the center of the filter. Thus, all of the anesthetic and oxygen not consumed by the patient is returned to the filter 9 where the carbon dioxide is removed by the soda lime as it flows to the annular space 11. An additional make-up supply of an anesthetic mixed with oxygen at a slight positive pressure of 10 mm. to 20 mm. Hg is continuously supplied to the annular space 11 of filter 9 through a conduit 13 to replace the anesthetic and oxygen consumed. A pop-off valve 14 is provided on the filter 9 to limit the pressure of the anesthetic mixture in the annular space 11. As thus far described the system is conventional.

In accordance with the present invention, the liquid anesthetic is supplied to conduit 13 at a controlled and measured rate which is then evaporated in a stream of oxygen at a controlled and measured rate to accurately control the concentration of anesthetic in the mixture and the amount of anesthetic inhaled by the patient. Thus, the anesthetizing apparatus of the present invention avoids any variations in the concentration of anesthetic in saturated mixture resulting from temperature and pressure changes and the proper dilution of saturated mixtures.

A simplified apparatus for supplying a mixture of measured quantities of the anesthetic and oxygen is shown in FIGURE 1 for purposes of illustration. The apparatus as shown comprises a box 15 for mounting the elements in a self-contained unit. Oxygen is supplied to the box 15 from a bottle 16 through a reducing valve 17, and liquid anesthetic is supplied from a tank 18 mounted in the top of the box and having a filling opening 19. The mixture of anesthetic and oxygen is delivered from the box to the filter 9 through the conduit 13 extending from the side of the box 15. Flow meters 20 and 21 for measuring the flow of liquid anesthetic and oxygen gas, respectively, are mounted on and exposed at the front of the box 15. A flow control element 22 is provided at the front of the box 15 below the flow meter 20 for controlling the flow of liquid anesthetic, and a corresponding flow control element 23 is provided for controlling the flow of oxygen. The handle of a meter reset device 24 is also illustrated in FIGURE 1.

FIGURE 2 illustrates the arrangement of elements and paths of flow for liquid anesthetic and oxygen gas. Liquid anesthetic flows by gravity from the supply tank 18 through a liquid path including a conduit 25 connecting the bottom of the tank to the bottom of the flow meter 20. The tank preferably has a filter 35 therein to filter out particulate matter which is apt to interfere with the proper operation of the flow meter 20. The liquid flows upwardly through flow meter 20 and from the upper end thereof through a conduit 26 to a reset device 24. The liquid anesthetic flows through the reset device 24 to the adjustable flow control valve 22 through a conduit 27, and from the valve through a conduit 28 to a mixing conduit 29 connected to and forming a continuation of the outlet conduit 13 connected to the filter 9.

Oxygen is delivered from the bottle 16 through the reducing valve 17 to the adjustable flow control valve 23 through conduit 30 at the bottom of the flow meter 21 and flows upwardly through the valve and meter. The upper end of the flow meter 21 is connected by a conduit 31 to the mixing conduit 29. A porous capillary diffusing baffle 32, such as wire mesh, is positioned beyond the juncture 33 of the conduits 28 and 31 onto which the liquid anesthetic flows and is distributed to provide an extended liquid surface in the path of the stream of oxygen to promote evaporation. In place of the baffle 32, a capillary tube having a plurality of small holes may extend from the end of conduit 28 into the mixing tube 29 to deliver anesthetic for evaporation in the oxygen, or a porous body may be employed. Heat transfer fins 34 may be provided around the mixing conduit 29 beyond the junction point 33 to supply heat from the ambient to promote evaporation of the liquid anesthetic.

The flow meter 20 for measuring the flow of liquid anesthetic is adapted to accurately measure and indicate the flow of liquid at rates ranging from .01 to 2.00 cc. per minute while the flow meter 21 for measuring the flow of oxygen is calibrated from 150 to 9000 cc. per minute. The flow meters 20 and 21 may be of any suitable type for measuring the slow flow rate of anesthetic in liquid phase and oxygen in gaseous phase, such as Rotormeters, each comprising a vertically extending transparent tube and a member in the tube moved upwardly by the drag of the fluid to a particular position of equilibrium in the tube for each rate of flow.

Preferably, a ball type flow meter is used like that shown in FIGURE 5, for measuring the rate of flow of liquid anesthetic. Such a flow meter comprises a vertically arranged transparent tube 36 diverging slightly from the bottom to the top and having a ball 37 therein of a specific gravity greater than the specific gravity than the liquid being measured. Thus, the velocity of the liquid flowing upwardly through the tube and the upward drag force produced on the ball 37 is dependent upon the annular space between the ball and tube. However, the ball 37 moves to a static position of equilibrium in the tube 36 when the stream of flowing liquid produces a drag force equal and opposite the force of gravity acting on the ball. The equilibrium condition of opposed drag and gravity forces acting on ball 37 is produced at progressively higher positions in the tube at increasing flow rates so that the particular position of the ball will measure and indicate a particular flow rate. In the illustrated embodiment, three balls 37, 37a and 37b are shown having increasing densities from the top downwardly for measuring and indicating the rate of flow at different ranges of flow rate, but the design may be such that a lesser number of balls, or even one, will measure the flow rate over the entire range. The size of the tube 36 and the densities of the balls 37, 37a and 37b is selected to indicate the rate of flow of a liquid anesthetic in a range of .01 to 2.00 cc. of liquid per minute and the rate of flow is indicated on a calibrated scale 38 adjacent the tube 36. Flutes 39 and 40 are provided at the bottom and top of the tube 36 to limit the movement of the balls 37.

The gas flow meter 21 for measuring the rate of flow of oxygen may also be of the ball type illustrated in FIGURE 5. The calibrated scale 41, however, indicates the higher flow rate of oxygen gas in a range of 150 to 9000 cc. per minute.

The flow control devices 22 and 23 each comprise a manually adjustable needle valve as illustrated in FIGURE 3. Such a needle valve comprises a hollow body 44 having a cylindrical bore 49 extending to one end of the body, an inlet opening 45 at the opposite end and an outlet opening 46 at the side thereof. Threaded nipples 47 and 48 project from the hollow body 44 around the inlet and outlet openings 45 and 46 and form a part of a coupling for connection to the conduits 27 and 28. The cylindrical opening 49 at the interior of the hollow body 44 has a conical counter bore 50 concentric with the inlet opening 45 to provide a valve seat of one taper, and a plunger 51 is mounted in the cylindrical opening 49 having a reduced stem with a conical needle valve head 52 of a different taper than and in axial alignment with the conically tapered counter-bore 50 around the inlet opening 45. The plunger 51 and outer end of the cylindrical opening 49 have cooperating screw threads for moving the plunger axially of the cylindrical opening 49 to adjust the needle valve head 52 relative to the conical counter-bore 50 and the reduced stem provides an annular space through which the liquid anesthetic flows from inlet 45 to outlet 46. A serrated disk 53 is provided at the outer end of the plunger 51 to facilitate turning the plunger 51 and move the conical needle valve head 52 toward and away from the conical counter-bore 50 and thereby control the annular opening therebetween and the rate of flow through the liquid system.

At the very slow rates of flow of liquid anesthetic the indicating ball 37 of the flow meter 20 is apt to be quite sluggish and slow to respond to small changes in the flow rate. In order to move the ball 37 to a desired position in either direction and then adjust the needle valve 22 to produce the flow indicated, the ball reset device 24 is provided in the liquid line between the outlet from the flow meter 20 and needle valve 22. As shown in FIGURE 4, the reset device 24 has a hollow body 56 generally similar to the hollow body 44 of the needle valve 22 and a plunger 57 generally similar to the plunger 51 of the needle valve. However, the plunger 57 has a reduced stem 58 positioned in the hollow body 56 and cooperating screw threads 59 and 60 on the body and plunger have a long lead so that turning of the plunger a small angular distance relative to the hollow body will displace a relatively large quantity of the liquid anesthetic either into or out of the hollow body 56. Thus, by turning the plunger 57 in one direction, liquid anesthetic is displaced from the hollow body 56 and caused to flow downwardly through the flow meter 20 and back through the conduit 25 to the reservoir vessel or tank 18. Such movement of the liquid in a reverse direction moves the ball 37 downwardly. By moving the plunger 57 in the opposite direction, the ball is moved upwardly. By carefully turning the plunger 57 of the reset device 24 with one hand, the ball 37 of meter 20 can be moved to the position desired to indicate a particular flow rate, and the plunger 51 of the needle valve 22 may be turned simultaneously by the other hand to adjust the rate of flow so as to immediately change the rate of flow of liquid anesthetic when required. The resetting of the ball 37 upwardly or downwardly and the adjustment of needle valve 22 to change the flow rate may be performed during an anesthetizing operation without danger of increasing or decreasing the concentration of the anesthetic above or below that desired as the needle valve limits the flow of liquid to the mixing tube 29. The reset device 24 may take other forms, such as a manually adjustable bellows or other adjustable volume device in the liquid line to perform the same function as the plunger 57 and the reset device may be combined with the needle valve 22. One form of the invention having now been described, the mode of operation is next explained.

To initiate operation of the apparatus, the valve of the oxygen bottle 16 is opened to deliver oxygen in gaseous phase from the bottle through the reducing valve 17 and needle valve 23 to the flow meter 21. As the oxygen flows through the meter 21 the ball 37′ therein is moved upwardly to an equilibrium position which indicates the rate of flow on the adjacent scale 41. The needle valve 23 is then adjusted until the proper rate of flow is produced. The oxygen flowing from the meter 21 then flows through the conduit 31 to the mixing conduit 29 and then through the conduit 13 to the filter 9.

After the rate of flow of oxygen has been adjusted, the closed needle valve 22 in the liquid line is opened which permits the liquid anesthetic to flow downwardly from the tank 18 by gravity and through the conduit 25 to the bottom of the flow meter 20. The liquid anesthetic then flows upwardly through the flow meter 20, through conduit 26 to the reset device 24 and from the reset device through the conduit 27, needle valve 22 and conduit 28 to the mixing conduit 29. As the liquid anesthetic flows through the flow meter 20, one or more of the balls 37, 37a and 37b will move upwardly to an equilibrium position in the tubes 36, see FIGURE 5 which will accurately measure the rate of flow. The plunger 51 of the needle valve 22 is slowly opened to gradually increase the rate of flow until the desired rate is produced as measured and indicated on the calibrated scale 38. Such adjustment of the flow rate is preferably performed by first manually actuating the reset device 24 to initially position the ball 37 to indicate the approximate flow rate desired and simultaneously adjusting the needle valve 22 to maintain the ball in equilibrium at the set position. This mode of operation permits adjustment without flooding the mixing tube 29 with anesthetic and is also helpful in initially eliminating air bubbles and particulate matter in the flow meter. The liquid anesthetic flows into the porous capillary diffuser baffle 32 which increases the surface area of the liquid in the path of flow of the oxygen. As the oxygen flows through the diffusing baffle 32, the liquid anesthetic is evaporated to provide a gaseous mixture of the anesthetic and oxygen. The heat transfer fins 34 augment the transfer of heat when required to insure evaporation of the liquid anesthetic. Thus, the absolute rate of liquid anesthetic supplied is controlled by the adjustable needle valve 22 and the flow rate is accurately indicated by the flow meter 20, so that liquid anesthetic at a known rate of flow is mixed with oxygen at a known rate of flow to produce a mixture of the desired and required concentration. For example, it may be desirable to subject the patient to a concentration of anesthetic in gaseous form approaching 2 percent by volume with oxygen, but never exceeding 2 percent, and to later reduce the amount of anesthetic supplied to the patient. When the supply of anesthetic is to be reduced, the anesthetist turns the plunger 57 of the reset device 24 to depress the ball to the lower level desired and simultaneously turns the plunger 51 of the needle valve 22 toward closed position. If the ball 37 tends to rise showing a greater rate of flow than that desired, the anesthetist again operates the reset device 24 to position the ball in the desired position and again adjusts the flow control needle valve 22. Thus, the rate of flow of liquid anesthetic may be easily and quickly adjusted from a higher to a lower flow rate when the absolute rate of flow is low.

The patient then inhales the mixture of anesthetic and oxygen through the face mask 6 and exhales through the tube 8 to the soda lime absorbent. Such rythmic breathing of the patient produces successive suction and pressure conditions in the apparatus which is compensated by the expansion and contraction of the breathing bag 10. During such operation of the apparatus, an additional supply of a mixture of anesthetic and oxygen at the proper concentration is continuously supplied to the filter 9 to make up the difference in the anesthetic and oxygen consumed by the patient.

It will now be observed that the present invention provides an improved apparatus for administering an anesthetic which accurately measures and controls the concentration of anesthetic delivered to the patient. It will also be observed that the present invention provides an anesthetizing apparatus which measures the flow rate of the anesthetic in liquid phase and then evaporates the liquid anesthetic in oxygen to directly produce the desired mixture. It will further be observed that the present invention provides a liquid flow meter and reset device which are adapted to be easily and quickly adjusted to accurately control and measure the amount of liquid anesthetic delivered at extremely slow flow rates. It will still further be observed that the present invention provides an apparatus of the type indicated which is of extremely simple and compact construction, economical to manufacture and reliable in operation.

While a single embodiment of the invention is herein illustrated and described, it will be understood that changes may be made in the construction and arrangement of elements without departing from the spirit or scope of the invention. Therefore, without limitation in this respect the invention is defined by the following claims.

I claim:

1. Apparatus for controlling and accurately measuring the concentration of anesthetic delivered to a patient comprising a container for liquid anesthetic, a container for oxygen, a mixing tube for delivering a mixture of oxygen and anesthetic in gaseous form, conduits connecting the container for oxygen and the mixing tube to provide a path for the flow of oxygen from the container therefor to the mixing tube, a meter in said path of flow formed by the conduits for measuring the rate of flow of oxygen through said path, conduits connecting the container for liquid anesthetic at a location below the liquid level therein and the mixing tube providing a path for the gravity flow of liquid anesthetic from said container for liquid anesthetic to the mixing tube, said path of flow for liquid anesthetic formed by said conduits having a meter for measuring the rate of flow of liquid anesthetic, adjustable valves in the separate paths for oxygen and liquid anesthetic for controlling the flow of gas and liquid, a manually operable reset device between the meter and adjustable valve in the conduit forming the path of flow for liquid, said manually operable reset device having a manually operable member to displace liquid in either direction in the conduit and meter to adjust the meter reading without increasing the rate of flow through the adjustable valve to the mixing tube, and means in the mixing tube to which the liquid anesthetic is delivered providing an extended surface to evaporate the liquid anesthetic in the oxygen, whereby said reset device and valve for adjusting the flow of liquid anesthetic are adapted for manual adjustment to set the meter for the desired flow rate and set the valve to maintain the flow rate indicated by the meter.

2. Apparatus in accordance with claim 1 in which the conduits forming the path for liquid anesthetic comprises a conduit connecting the container for liquid anesthetic to the meter and a conduit connecting the meter to the mixing tube, the adjustable valve being a needle valve in the conduit from the meter to the mixing tube, and the manually operable reset device comprising a chamber in the last-named conduit between the meter and needle valve and a plunger movable in the chamber to cause a liquid to flow in either direction through the meter.

3. Apparatus in accordance with claim 1 in which the meter in the path for liquid anesthetic is in the form of an upright tapered tube diverging from the bottom toward the top, the conduit from the container for liquid anesthetic being connected to the bottom of the upright tube for flow upwardly therethrough, an indicating element in the tube having a greater density than the liquid which is moved upwardly to a position of equilibrium at any particular flow rate by the drag force of the flowing liquid, and a scale adjacent the tube to indicate the flow rate.

4. Apparatus in accordance with claim 1 in which the adjustable valves in the paths of gas and liquid flow are needle valves each having a conical seat and a manually rotatable plunger having a conical end for regulating the rate of flow and located adjacent its respective meter, and the reset device in the path of liquid flow comprising a chamber and a manually rotatable element constituting a plunger for displacing liquid to and from said chamber to cause it to flow in either direction through the meter.

5. Apparatus for controlling and accurately measuring the concentration of anesthetic delivered to a patient comprising a conduit having a mixing element therein in the form of a porous capillary diffusing baffle providing an extended surface to promote evaporation of liquid anesthetic, a container for liquid anesthetic, a conduit connecting the container for liquid anesthetic to the mixing element and including a valve for controlling and a meter for indicating the rate of flow of liquid anesthetic from said container to the mixing element, a container for oxygen, conduit means connecting the container for oxygen to the mixing element and including a valve for controlling and a meter for indicating the rate of flow of oxygen, said liquid anesthetic evaporating into said oxygen in said mixing element to produce any desired ratio of anesthetic to oxygen below saturation as controlled by the valves and indicated by the meters, and an outlet from which the mixture of oxygen and anesthetic is delivered in gaseous form.

References Cited in the file of this patent

UNITED STATES PATENTS

| 2,864,363 | Hay | Dec. 16, 1958 |
| 2,915,056 | Lee | Dec. 1, 1959 |